United States Patent [19]

Broyhill

[11] Patent Number: 5,150,814
[45] Date of Patent: Sep. 29, 1992

[54] CHEMICAL SPRAY TANK

[75] Inventor: Craig G. Broyhill, Dakota City, Nebr.

[73] Assignee: The Broyhill Company, Dakota City, Nebr.

[21] Appl. No.: 774,717

[22] Filed: Oct. 9, 1991

[51] Int. Cl.[5] ................................................ B65B 3/06
[52] U.S. Cl. .................................... 220/601; 220/661; 220/86.1
[58] Field of Search ............... 220/86.1, 661, 465, 220/729, DIG. 5, 601

[56] References Cited

U.S. PATENT DOCUMENTS

| 2,261,032 | 10/1941 | Keller | 220/86.1 |
| 2,554,557 | 5/1951 | Brown | 220/86.1 |
| 3,394,842 | 7/1968 | Randolph et al. | 220/86.1 |
| 4,013,105 | 3/1977 | Uuskallio | 220/DIG. 5 |
| 4,637,522 | 1/1987 | Klop | 220/86.1 |
| 4,655,361 | 4/1987 | Clover et al. | 220/86.1 |
| 4,986,436 | 1/1991 | Bambacigno et al. | 220/86.1 |
| 5,033,520 | 7/1991 | Kuehmichel | 220/86.1 |

Primary Examiner—Stephen Marcus
Assistant Examiner—S. Castellano
Attorney, Agent, or Firm—Zarley, McKee, Thomte, Voorhees & Sease

[57] ABSTRACT

A chemical spray tank comprising a bottom wall, front wall, back wall, opposite side walls and a top wall. The top wall of the tank is provided with a fill opening defined by a vertically disposed annular wall member adapted to receive a lid, or cover. An annular channel, or recessed area, extends around the annular wall member and has a bottom wall which is disposed between the upper and lower ends of the annular wall member. The bottom wall of the annular recessed area has one or more closable openings formed therein, so that chemical collected therein may be drained into the interior of the tank to prevent the chemical from flowing on to the ground, which would result in a chemical spill required to be reported.

3 Claims, 3 Drawing Sheets

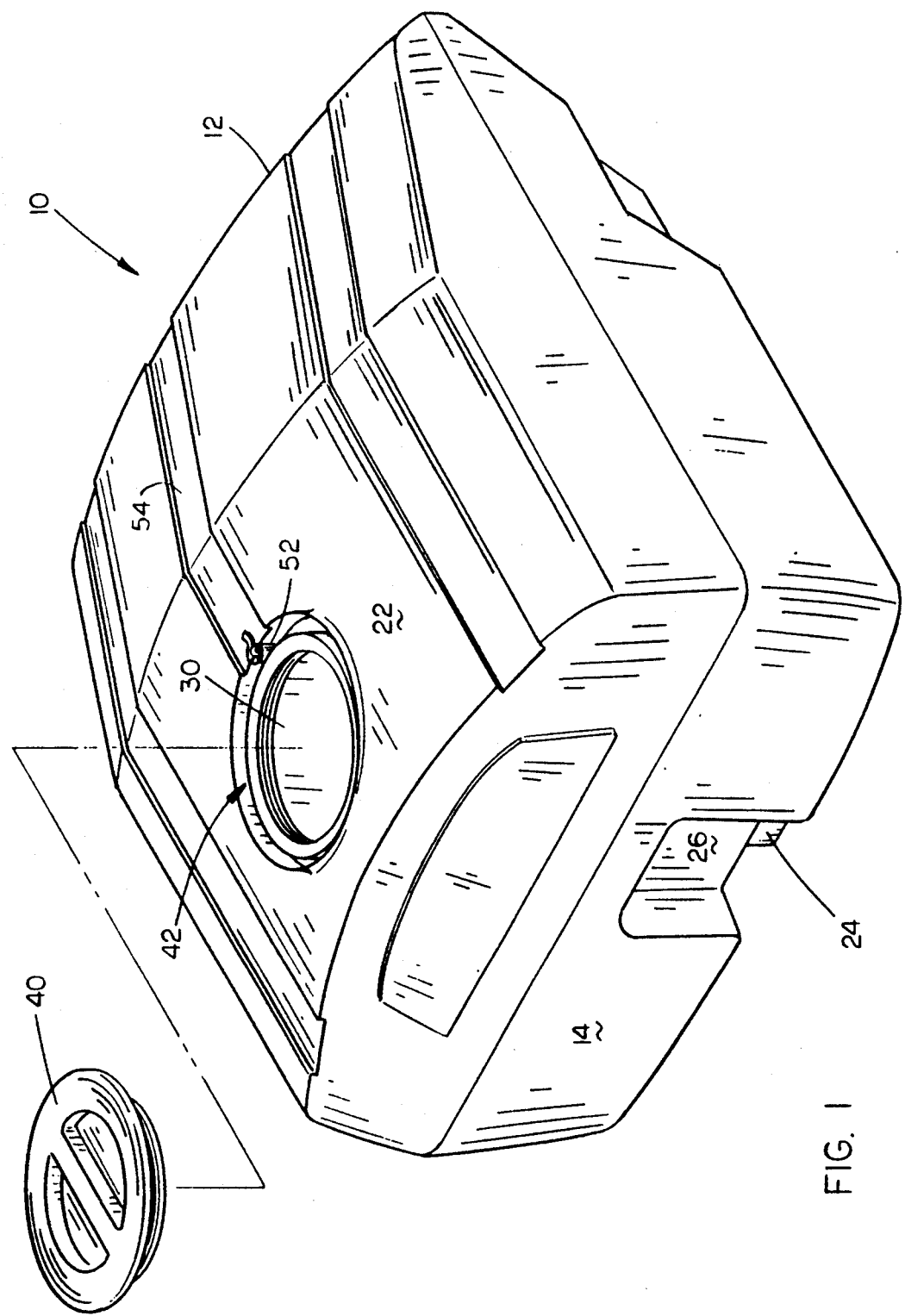

CHEMICAL SPRAY TANK

BACKGROUND OF THE INVENTION

Chemical spray tanks are commonly used for spraying liquid chemicals on fields and may be tractor mounted or mounted on an implement. The conventional spray tanks normally have a fill opening at the upper end thereof, into which the liquid chemicals and water are introduced. If the tank is over filled, the liquid chemical overflows from the tank and flows onto the ground. When such an accident occurs, the same must be reported either to the EPA or the local environmental protection agency, so that the chemical spill may be cleaned.

It is therefore a principal object of the invention to provide an improved chemical spray tank which prevents chemical spills when the tank is over filled.

A further object of the invention is to provide a chemical spray tank having an annular recessed area or channel which extends around the fill opening which is designed to collect liquid chemicals when the tank is over filled.

Yet another object of the invention is to provide a chemical spray tank including an annular channel which extends around the fill opening wherein the annular channel has closable opening formed therein so that any excess or spilled chemical may be collected in the channel and may be drained into the interior of the tank through the closable opening.

Yet another object of the invention is to provide a chemical spray tank which is economical to manufacture, durable in use and refined in appearance.

These and other objects will be apparent to those skilled in the art.

SUMMARY OF THE INVENTION

A chemical spray tank is disclosed including a bottom wall, front wall, back wall, opposite side walls, and a top wall. A fill opening is formed in the top wall of the tank and is closable by a conventional closure member such as a lid or the like. The fill opening is defined by a vertically disposed annular wall, which extends therearound. The upper end of the vertically disposed annular wall is located at a level below the uppermost portion of the top wall of the tank. An annular recessed area or channel is formed in the top wall of the tank and extends around the fill opening and includes a bottom wall, which is located at a level between the upper and lower ends of the annular wall member which defines the fill opening. The bottom wall of the recessed area, or channel, has one or more closable openings formed therein, so that any good chemical collected therein may be drained into the interior of the tank. The relationship of the vertically disposed annular wall member and the annular recessed area with respect to the upper portion of the top wall of the tank is such that air will be trapped in the tank below the bottom wall of the annular recessed area, so that the liquid chemical in the recessed area may be drained into the tank.

BRIEF DESCRIPTION OF THE DRAWINGS

FIG. 1 is a perspective view of the tank of this invention;

DESCRIPTION OF THE PREFERRED EMBODIMENT

Figure 4:
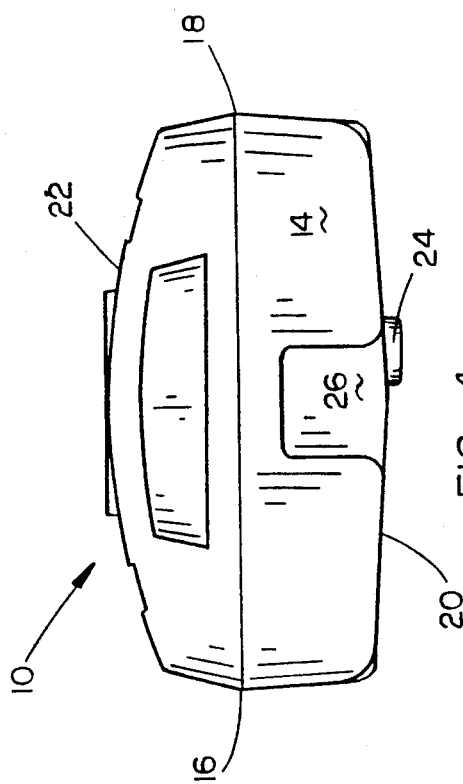
FIG. 4 is a front view of the tank of this invention.
Figure 5:
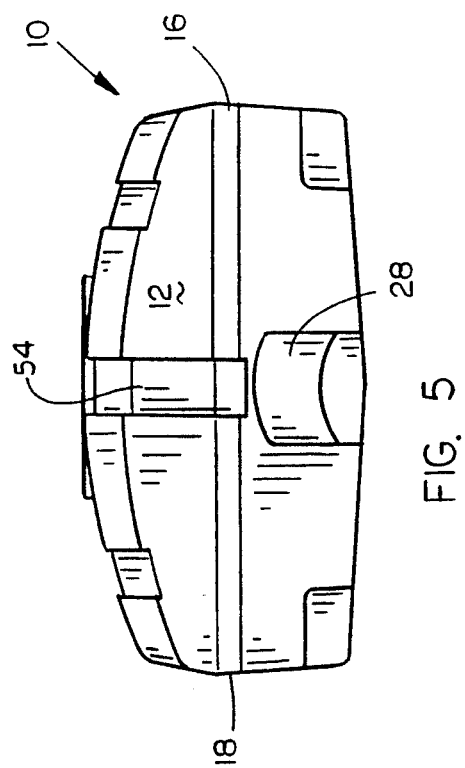
FIG. 5 is a rear view of the tank of this invention.
Figure 2:
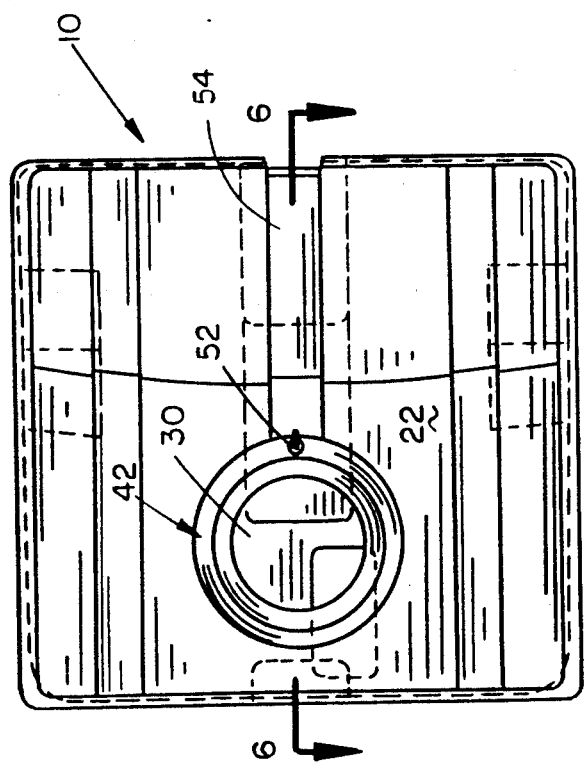
FIG. 2 is a top plan view of the tank of this invention.
Figure 3:
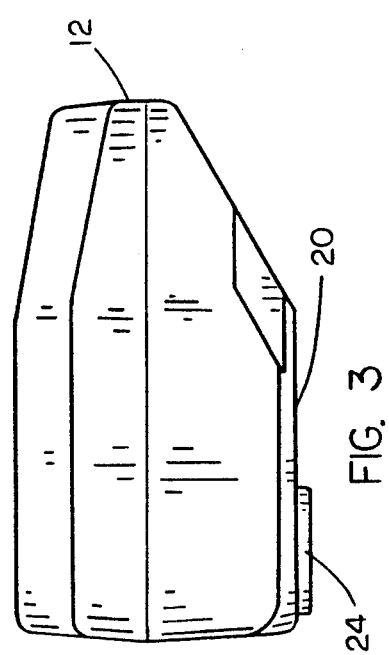
FIG. 3 is a side view of the tank of this invention.
Figure 6:
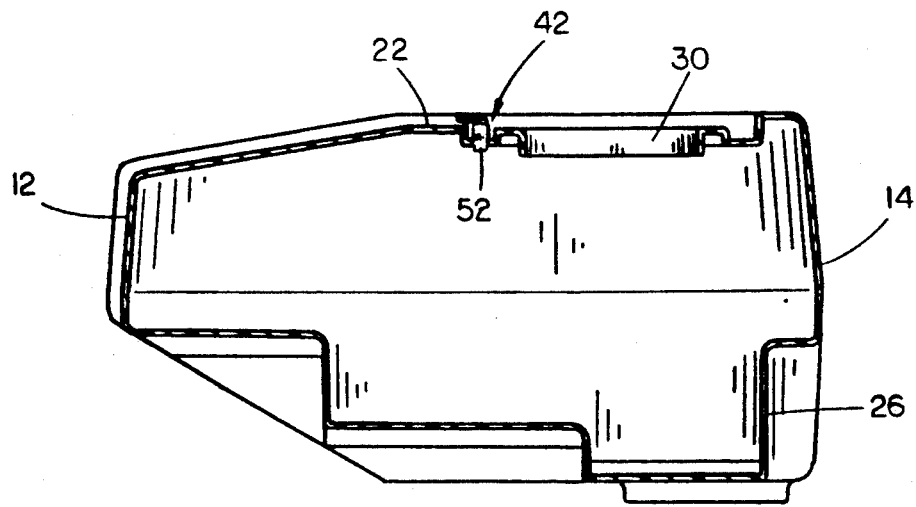
FIG. 6 is a sectional view seen on line 6—6 of FIG. 2.
Figure 7:
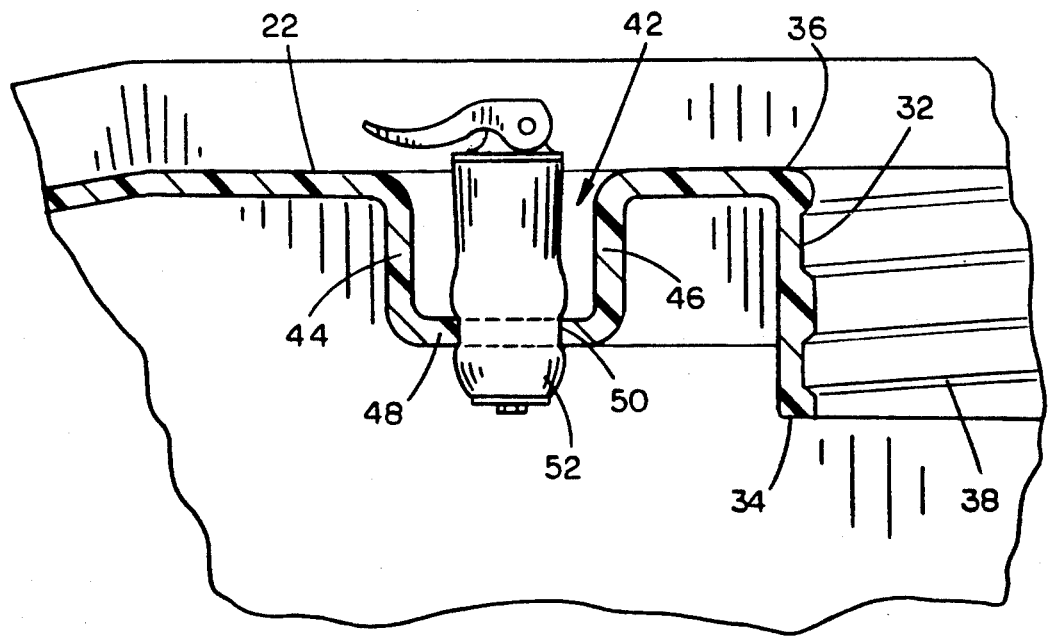
FIG. 7 is an enlarged sectional view of the annular recessed area and a portion of the fill opening.

The chemical spray tank of this invention is referred to generally by the reference numeral 10, and is preferably comprised of a suitable polyethylene or fiberglass material. Tank 10 includes a rear wall 12, front wall 14, opposite side walls 16 and 18, bottom wall 20, and curved top wall 22.

Bottom wall 20 includes a sump 24 to permit the tank to be emptied at times. In the particular embodiment illustrated in the drawing, front wall 14 includes a recessed area 26, adapted to accommodate structure on either the tractor or the implement carrying the tank. Similarly, back 12 includes a recessed area 28 adapted to receive or accommodate components on the tractor or implement carrying the tank. Various strengthening ribs or the like are also provided to strengthen the tank.

Top wall 22 is provided with a fill opening 30 formed therein which is defined by an annular, vertically disposed wall 32 having a lower end, 34 and an upper end, 36. Wall 32 is provided with threads, 38 to permit lid or cover, 40 to be received therein to close the fill opening 30.

An annular recessed area, or channel, 42, is formed in top wall, 22 around fill opening 30, and includes side walls, 44, 46 and bottom wall, 48. Bottom wall 48 is provided with one or more openings, 50 which are selectively closable by plugs or stoppers 52. Bottom wall, 48 is located at a level above the lower end, 34 and below the upper end, 36 of annular wall member 32. Preferably, recessed area 42 has a capacity of approximately one quart, so that any liquid overflowing from fill opening 30 will be collected in annular member 42, and may be drained into the interior of the tank by means of the opening 50. The relationship of the bottom wall, 48 with respect to the lower end, 34 of the annular wall 32 is important, as is their relationship with the upper-most portion of the tank since air will tend to be trapped below bottom wall 48 when the tank is filled, so that when the tank is filled, the chemical, if any, in annular recessed area 42 may still drain back into the interior of the tank.

If more liquid volume is spilled than the capacity of the recessed area 42, the excess liquid will follow the recessed trough 54 to the tank rear and be collected in a container attached to the tank or tank frame. This collection is away from the operator at a safe distance.

Thus, it can be seen that the invention accomplishes at least all of its stated objectives.

I claim:
1. A chemical spray tank comprising:
    a hollow tank member having a bottom wall, front wall, back wall, side walls, and a top wall;
    said top wall having a fill opening formed therein for receiving liquid chemicals;
    said fill opening being defined by an annular, vertically disposed wall member having upper and lower ends;
    the upper end of said fill opening wall member being located at level below the uppermost portion of said top wall;
    means for closing said fill opening;

said top wall having an annular recessed area formed therein which extends around said wall member;

said annular recessed area having a bottom wall which is disposed between the upper and lower ends of said fill opening wall member;

said annular recessed area having at least one closable opening formed therein which communicates with the interior of said tank member.

2. The chemical spray tank of claim 1, wherein said top wall includes a recessed trough formed therein and extending rearwardly from said fill opening and annular recessed area to the back wall of said container.

3. The chemical spray tank of claim 1 wherein the lower end of said vertically disposed wall member is located at a level below the uppermost portion of said top wall and located at a level below said bottom wall of said recessed area so that air will be trapped in said tank member, when said tank member is filled below the closable opening in said bottom wall of said recessed area.

* * * * *